United States Patent [19]

Hohberg et al.

[11] Patent Number: 5,138,490
[45] Date of Patent: Aug. 11, 1992

[54] ARRANGEMENT FOR CHANGING THE GEOMETRICAL FORM OF A LIGHT BEAM

[75] Inventors: Gerhard Hohberg, Aalen; Kurt Becker, Oberkochen, both of Fed. Rep. of Germany

[73] Assignee: Carl-Zeiss-Stiftung, Heidenheim, Fed. Rep. of Germany

[21] Appl. No.: 505,176

[22] Filed: Apr. 5, 1990

[30] Foreign Application Priority Data

Apr. 29, 1989 [DE] Fed. Rep. of Germany ....... 3914275

[51] Int. Cl.$^5$ ............................ G02B 5/10; G02B 5/18
[52] U.S. Cl. .................................. 359/570; 359/572; 359/850; 359/857; 219/121.74; 219/121.76; 219/121.79; 219/121.85
[58] Field of Search ........... 350/162.2, 162.21, 162.23, 350/613, 614, 628, 629, 630; 359/570, 572, 574, 850, 857, 867; 219/121.6, 121.61, 121.73, 121.74, 121.76, 121.79, 121.85

[56] References Cited

U.S. PATENT DOCUMENTS

| | | | |
|---|---|---|---|
| 3,888,589 | 6/1975 | Swift | 350/612 |
| 4,302,105 | 11/1981 | Sick | 350/171 |
| 4,484,334 | 11/1984 | Pressley | 350/628 |
| 4,553,017 | 11/1985 | Addleman | 219/121.73 |
| 4,620,230 | 10/1986 | Spiger | 350/613 |
| 4,692,583 | 9/1987 | Kimura et al. | 350/613 |
| 4,798,446 | 1/1989 | Hettrick | 350/162.23 |

FOREIGN PATENT DOCUMENTS

| | | |
|---|---|---|
| 0080597 | 6/1983 | European Pat. Off. . |
| 1171744 | 8/1985 | U.S.S.R. ............ 350/162.23 |
| 2062282 | 5/1981 | United Kingdom . |

*Primary Examiner*—Rodney B. Bovernick
*Assistant Examiner*—R. D. Shafer
*Attorney, Agent, or Firm*—Walter Ottesen

[57] ABSTRACT

The invention is directed to a mirror for changing the geometric shape of a light beam. A two-dimensional intensity distribution substantially independent of the mode structure can be generated by mounting a grating in the optical beam path of the laser beam. The intensity distribution is constant in one direction and, in a direction perpendicular thereto, the intensity can have any preselectable intensity distribution.

5 Claims, 1 Drawing Sheet

ARRANGEMENT FOR CHANGING THE GEOMETRICAL FORM OF A LIGHT BEAM

FIELD OF THE INVENTION

The invention relates to an arrangement for changing the geometrical form of a light beam having several zones. The invention also relates to a method of using the arrangement to process the surface of a workpiece.

BACKGROUND OF THE INVENTION

Mirrors for changing the geometrical form of a beam are widely known. It is difficult to generate a beam cross section which has a configuration which can be essentially rectangular to linear and within which the intensity of the beam has a predeterminable value. Such beam cross sections are necessary especially for conducting surface treatment with a laser to name only one essential area of application.

SUMMARY OF THE INVENTION

A mirror for changing the geometrical form of a light beam is disclosed in the copending application of Gerhard Hohberg entitled "Mirror for Changing the Geometrical Form of a Light Beam" having U.S. Ser. No. 505,177 and filed on Apr. 5, 1990, now abandoned. The arrangement of the present invention includes a mirror of the kind disclosed in this copending application.

It is an object of the present invention to impart a two-dimensional beam cross section to a light beam having any beam cross section within which the intensity has an intensity distribution predetermined in at least one direction. It is another object of the invention to provide the two-dimensional cross section by optically imaging only twice.

The arrangement of the invention is for changing the geometric form of a light beam. The arrangement includes: beam source means for supplying a light beam defining a beam path; a mirror disposed in the beam and defining an axis, the mirror having a plurality of strip-like segments disposed one next to the other; the segments having respective sizes selected so as to cause the light beam to impinge simultaneously upon the segments so as to reflect respective zones of the beam; the segments each being formed and aligned so as to cause the zones to be directed to one component region on the axis; and, grating means disposed in the beam path for fanning the beam in a predetermined direction.

With the mirror arrangement according to the invention, a two-dimensional intensity distribution is obtained which is constant in one direction and has any preselectable intensity distribution in the direction perpendicular to the first direction. To achieve this two-dimensional intensity distribution, the laser beam is fanned by a suitable grating structure in a direction perpendicular to the grating. For this purpose, the reflecting grating is preferably disposed between the work plane and the mirror for changing the geometric shape of the light beam.

Mirrors of the kind described above can be advantageously used when treating the surfaces of workpieces with strip-like radiation by means of a laser.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
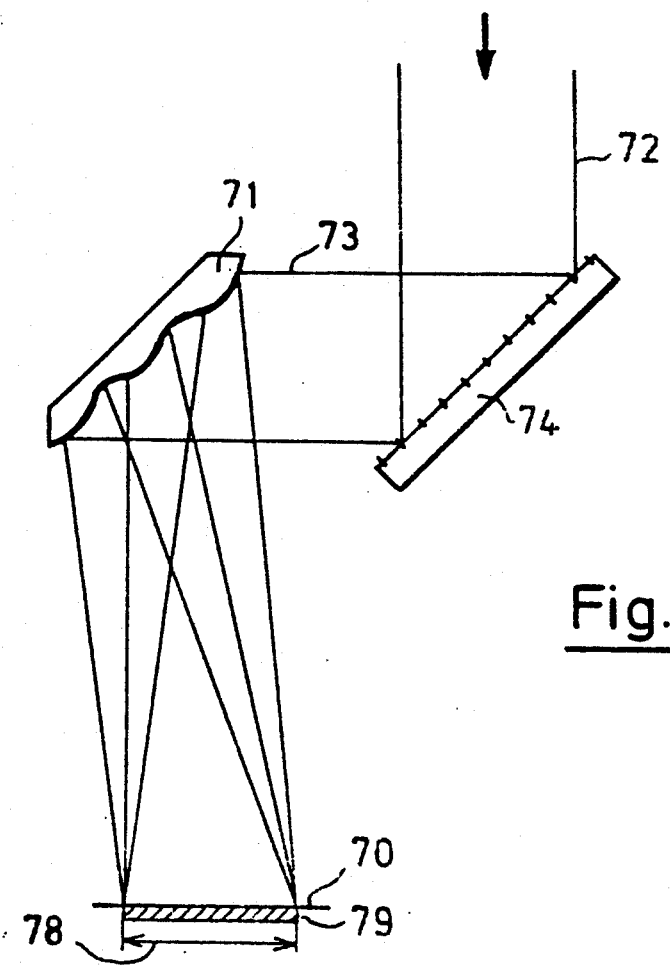
FIG. 1 is a mirror-grating arrangement according to an embodiment of the invention; and, FIG. 2 is an arrangement according to another embodiment of the invention wherein the grating is mounted between the work plane and the mirror.

In FIG. 1, the mirror and grating arrangement converts a laser beam 72 into a two-dimensional intensity distribution on the surface 70 of a workpiece 79. The mirror 71 can generate only a constant linear intensity distribution. For this purpose, the laser beam 72 can have any mode structure.

The optical arrangement must be expanded with a grating 74 in order to obtain a two-dimensional intensity distribution with the mirror 71. This grating 74 fans the laser beam 72 ahead of the mirror 71 with its grating structure in a perpendicular direction referred to the grating structure. The grating 74 is a planar reflection grating and can be manufactured with a numerically controlled machine without difficulty by means of milling or planing. The configuration of the grating 74 as a reflection grating affords the advantage that high radiation intensities can be directed onto the work region 78 of the workpiece 79 and the grating 74 and the mirror 71 can be cooled during operation.

As mentioned above, the advantageous separation of the two optical components (mirror 71 and grating 74) allows for manufacture without difficulty. An additional advantage afforded by the invention is that with a suitable grating structure (that is, the selected groove structure adapted to the wavelength of the laser beam and the like), the two-dimensional intensity distribution in one direction is constant and in the direction perpendicular to the one direction, the intensity distribution is preselectable and rapidly changeable.

Figure 2:
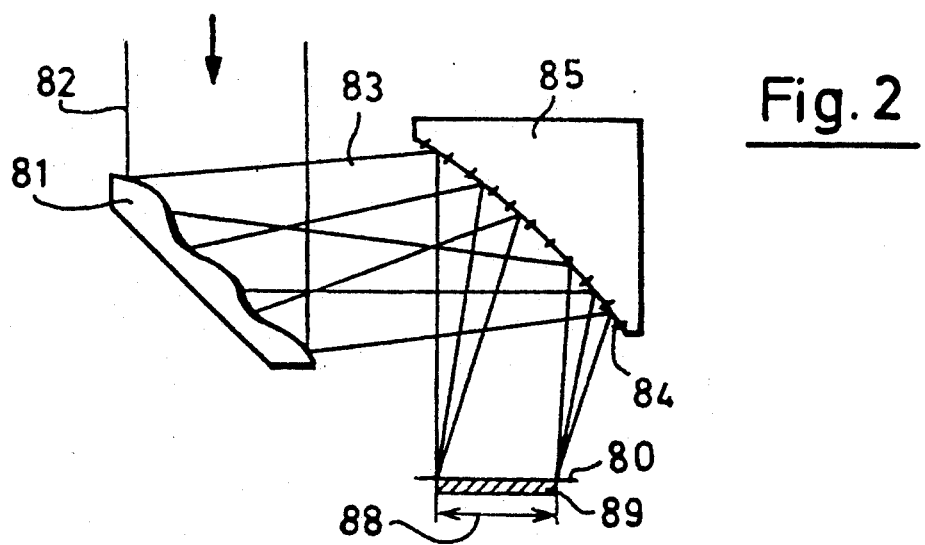

However, it should be noted that the imaging of the grating 74 and of the mirror 71 are not independent of each other. If the grating 74 is disposed ahead of the mirror 71, then the laser beam 73 deflected by the grating 74 is imaged only partially correctly by the mirror 71. This problem can be avoided in that the grating 85 is disposed downstream of the mirror 81 in the optical beam path. This arrangement is shown in FIG. 2 and permits a very precise imaging of the laser beam 82 on the work region 88 of the surface 80 of the workpiece 89.

The beam 83 reflected by the mirror 81 is fanned out on the curved surface 84 of the grating 85, which here too is a reflection grating, in the direction perpendicular to the grating structure. In this way, a two-dimensional intensity distribution is generated in the work area which in one direction is constant (by means of the mirror 81) and in the direction perpendicular thereto, the intensity distribution is preselectable (by the grating 85).

The curved surface of the reflection grating 85 has manufacturing advantages in that a manufacturing operation such as turning (cutting) can be performed in lieu of milling or planing. Furthermore, the intensity distribution on the surface 80 of the workpiece 89 can be changed by exchanging the grating 85.

Although the grating can be applied directly to the mirror 81, the advantages described above and afforded by the modular configuration of the optical arrangement would then be lost.

It is understood that the foregoing description is that of the preferred embodiments of the invention and that various changes and modifications may be made thereto without departing from the spirit and scope of the invention as defined in the appended claims.

What is claimed is:

1. An arrangement for changing the geometric form of a light beam, the arrangement comprising:
   beam source means for supplying a light beam defining a beam path;
   a mirror disposed in said beam path;
   said mirror having a plurality of strip-like mirrored segments disposed one next to the other and said segments defining a common symmetry axis;
   said segments having respective sizes selected so as to cause the light beam to impinge simultaneously upon several of said segments so as to reflect respective zones of said beam;
   said segments each being formed and aligned so as to cause each one of said zones to be reflected and directed to a strip-like region of an object with said zones being superposed on each other on said strip-like region; and,
   a diffraction grating disposed in a spaced relationship to said mirror and being arranged in said beam path for fanning said beam and to coact with said mirror to convert said laser beam into a two-dimensional intensity distribution which is constant in one direction and has any preselectable intensity distribution in a direction perpendicular to said one direction.

2. The arrangement of claim 1, wherein said grating is a reflection grating.

3. The arrangement of claim 2, wherein said grating has a curved surface.

4. The arrangement of claim 1, wherein said grating is disposed downstream of said mirror.

5. A method of processing the surface of a workpiece with a laser beam defining a beam path and a mirror having a plurality of strip-like mirrored segments defined by rotational bodies and being disposed one next to the other and the segments defining a common symmetry axis, the method comprising:
   directing a laser beam toward said mirror so as to impinge simultaneously upon several of said segments so as to reflect respective zones of said beam;
   forming and aligning all of said segments so as to cause said zones to be reflected and directed to one strip-like work area on the surface of the workpiece; and,
   placing a diffraction grating in the beam path for fanning the beam and for coacting with the mirror to convert the beam into a two-dimensional intensity distribution which is constant in one direction and has any preselectable intensity distribution in a direction perpendicular to said one direction.

* * * * *